(12) United States Patent
Morris et al.

(10) Patent No.: US 9,686,130 B2
(45) Date of Patent: Jun. 20, 2017

(54) CONFIGURATION MANAGEMENT FOR NODES IN A NETWORK

(71) Applicant: LANDIS+GYR INNOVATIONS, INC., Alpharetta, GA (US)

(72) Inventors: Richard Morris, Lafayette, IN (US); James Coburn, Snellville, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 31 days.

(21) Appl. No.: 14/753,302

(22) Filed: Jun. 29, 2015

(65) Prior Publication Data

US 2016/0380810 A1 Dec. 29, 2016

(51) Int. Cl.
*H04L 12/24* (2006.01)

(52) U.S. Cl.
CPC ...... *H04L 41/0803* (2013.01); *H04L 41/0813* (2013.01); *H04L 41/0889* (2013.01); *H04L 41/0843* (2013.01); *H04L 41/0866* (2013.01)

(58) Field of Classification Search
CPC .................................................. H04L 41/0803
See application file for complete search history.

(56) References Cited

U.S. PATENT DOCUMENTS

| 6,128,656 A | 10/2000 | Matchefts et al. | |
|---|---|---|---|
| 2006/0143144 A1* | 6/2006 | Speeter ............... | H04L 67/125 706/47 |
| 2010/0070319 A1* | 3/2010 | Prafullchandra ...... | G06Q 10/06 726/22 |
| 2012/0117203 A1* | 5/2012 | Taylor .................. | G06F 9/4411 709/220 |

(Continued)

FOREIGN PATENT DOCUMENTS

| GB | 2405711 | 3/2005 |
|---|---|---|
| WO | 2017003737 | 1/2017 |

OTHER PUBLICATIONS

PCT/US2016/038363, "International Search Report and Written Opinion", Sep. 19, 2016, 14 pages.

(Continued)

*Primary Examiner* — Albert T Chou
(74) *Attorney, Agent, or Firm* — Kilpatrick Townsend & Stockton LLP (57) ABSTRACT

Disclosed are various embodiments for managing configuration changes applied to node devices in a network. Expected and target configuration files for a node are obtained, where the configuration files specify various parameters with corresponding values. A computing device determines a different one of the parameters having different corresponding values between the configuration files. A governing one of the parameters on which the different parameter depends is determined based at least in part upon a parameter reference. The computing device calculates a checksum for the governing parameter based at least in part upon a corresponding value of the governing parameter. Instructions are generated to calculate a checksum for the governing parameter currently configured in the node. The instructions further specify that, in response to the checksums matching, the different parameter in the node should be configured with a corresponding value of the different parameter as specified by the target configuration file.

20 Claims, 6 Drawing Sheets

(56) References Cited

U.S. PATENT DOCUMENTS

2013/0238768 A1     9/2013  Vaidya et al.
2014/0082160 A1 *   3/2014  Mallur ..................... G06F 8/61
                                                        709/220

OTHER PUBLICATIONS

ANSI.,"American National Standard for Utility Industry End Device Data Tables", National Electrical Manufacturers Association, IEEE No. 1377-2009, Measurement Canada No. MC1219-2009, ANSI C12.19-2008, Apr. 2008, 578 pages.

* cited by examiner

CONFIGURATION MANAGEMENT FOR NODES IN A NETWORK

BACKGROUND

Networked nodes, such as smart meters in an AMI (advanced metering infrastructure) network, are configured according to configuration data stored on the nodes, where the configuration data is made up of modifiable parameters and corresponding values. Occasionally, a configuration of a node needs to be changed or otherwise set to a known value. Due to various possible limitations, transmitting a complete configuration to the node that includes the change may be impracticable. In order to successfully manage the nodes, the ability to make reliable configuration updates to a node in spite of these limitations is needed.

SUMMARY

Various aspects of the present invention relate to managing configuration changes applied to node devices in a network. A computing device obtains an expected configuration file for the node and a target configuration file for the node, where the configuration files each specify various parameters with corresponding values. The computing device determines a different one of the parameters having different corresponding values between the configuration files. A governing one of the parameters on which the different parameter depends is determined based at least in part upon a parameter reference. The computing device calculates a checksum for the governing parameter based at least in part upon a corresponding value of the governing parameter specified by the expected configuration file. Instructions are generated to calculate a checksum for the governing parameter currently configured in the node. The calculation of the checksum in the node is based at least in part upon a corresponding value of the governing parameter currently configured in the node. The instructions further specify that, in response to the checksums matching, the different parameter in the node should be configured with a corresponding value of the different parameter as specified by the target configuration file.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The techniques disclosed herein are directed to managing configuration changes applied to node devices in a network. The operation of the individual nodes in the network is configured by a set of modifiable parameters and corresponding values that make up the configuration data stored on the node. On occasion, a headend system managing the node may need to change some portion of the configuration data for a node from its expected configuration. Due to limitations in the node and/or in the network in which the node participates, transmitting a complete configuration that includes the changed portion is impracticable. As a result, the needed configuration changes may be sent to the node incrementally as one or more instructions.

In addition, the expected configuration for a node that is available to the headend system may differ from the actual configuration of the node due to configuration changes being applied to the node over time, perhaps by other devices, without reflecting these changes to the expected configuration associated with the node that is used by the headend system and/or other computing devices. This can leave the node in an state in which its actual configuration is uncertain to the headend system. Moreover, the limitations that inhibit transmitting a complete configuration to the node also inhibit receiving a complete configuration from the node. A given configuration change may be safe to apply to a node, even though the complete configuration is uncertain, as long as any portions of the configuration on which the change depends are confirmed prior to making the change in the node.

To this end, a computing device identifies a change to be made to the configuration of a node by, for example, performing a comparison between the expected configuration file for the node and the target configuration file for the node. Once the change is identified, the computing device determines any other parameters on which the change depends (also referred to as "governing parameters") through use of a parameter reference that specifies relationships among the various possible parameters and corresponding values of a configuration file for a node. For example, if the configuration change relates an option parameter for a service of the node, the parameter reference could indicate that the configuration for the option first depends upon a parameter that indicates that the service is enabled in the node.

Upon determining the governing parameter(s), a checksum is calculated for the corresponding value of each of the governing parameters as specified by the expected configuration. Thereafter, instructions are created that direct the node to calculate a checksum for the corresponding value of each of the governing parameters configured in the node. The instructions further direct the node to make the identified configuration change to its configuration once it is verified that the checksum(s) calculated by the node match the corresponding checksum(s) specified by the instructions.

As defined herein, an "expected configuration" is data representing what is considered to be the current configuration of one or more nodes by the headend system.

As defined herein, a "target configuration" is data representing the configuration that is sought to be applied to one or more nodes.

Throughout the disclosure, a "configuration" may also be referred to as a "config."

As defined herein, a "different parameter" is a parameter having different corresponding values between the expected configuration and the target configuration based upon a comparison of the configurations.

As defined herein, a "governing parameter" is a parameter on which the different parameter depends.

In the following discussion, a general description of the system and its components is provided, followed by a discussion of the operation of the same.

Figure 1:
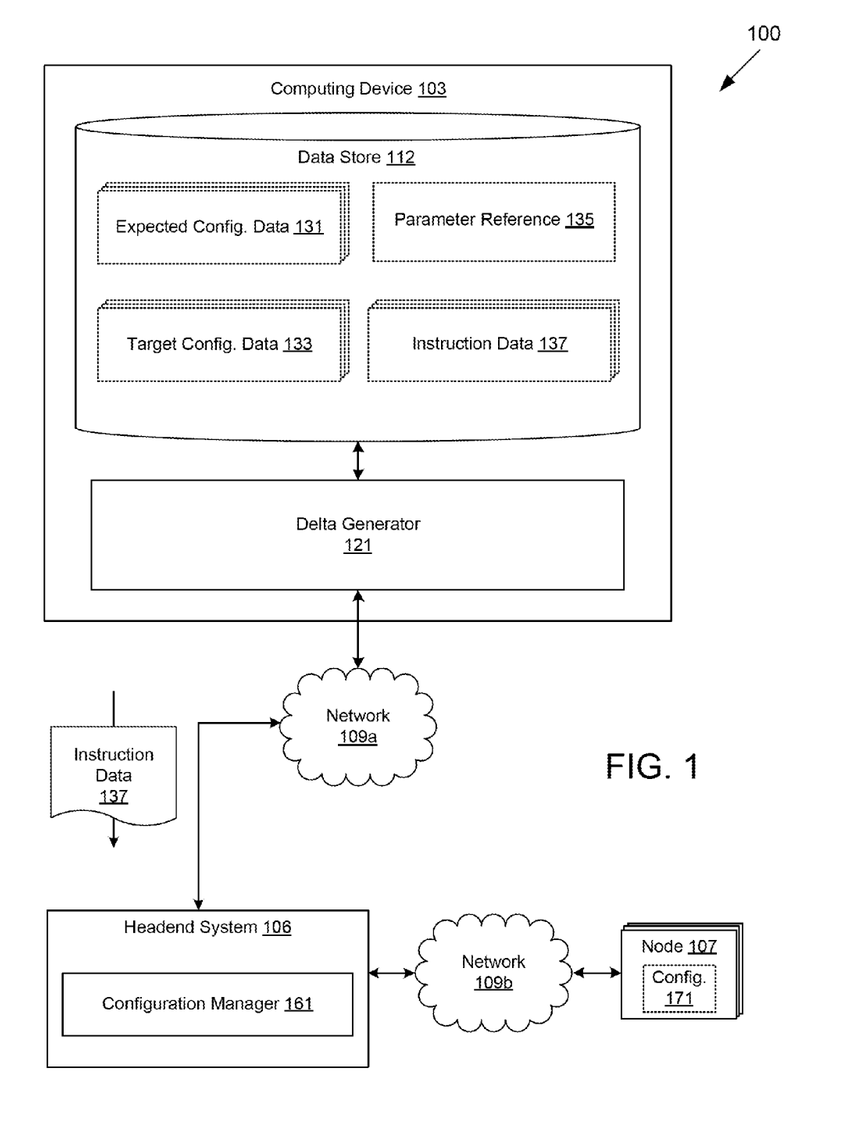
FIG. 1 is a drawing of a networked environment according to various embodiments of the present disclosure.

With reference to FIG. 1, shown is a networked environment 100 according to various embodiments. The networked environment 100 includes a computing device 103, a headend system 106, and a node 107. The computing device 103 is in communication with the headend system 106 via a network 109a, while the headend system 106 is in communication with the node 107 via the network 109b. The networks 109a-b each include, for example, wide area networks (WANs), local area networks (LANs), wired networks, wireless networks, internets, intranets, extranets, or other suitable networks, etc., or any combination of two or more such networks. For example, such networks may comprise satellite networks, cable networks, Ethernet networks, and other types of networks.

The computing device 103 may comprise, for example, a server computer or any other system providing computing capability. Alternatively, the computing device 103 may represent a plurality of computing devices that may be arranged, for example, in one or more server banks or computer banks or other arrangements. Such computing devices may be located in a single installation or may be distributed among many different geographical locations. For example, the computing device 103 may represent a plurality of computing devices that together may comprise a hosted computing resource, a grid computing resource and/ or any other distributed computing arrangement. In some cases, the computing device 103 may correspond to an elastic computing resource where the allotted capacity of processing, network, storage, or other computing-related resources may vary over time.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a delta generator 121 and other applications, services, processes, systems, engines, or functionality not discussed in detail herein. The delta generator 121 is executed to generate instructions for carrying out incremental configuration changes to one or more nodes, while ensuring that each configuration change applied has first validated values of any parameters dependent upon the changes.

The data stored in the data store 112 includes, for example, expected configuration data 131, target configuration data 133, a parameter reference 135, instruction data 137, and potentially other data. The expected configuration data 131 includes one or more node configurations that have been stored. Once notice is received that a configuration change is applied to a given node 107, the configuration that corresponds to the given node 107 may also be updated with the change in an effort to maintain current configuration status. The target configuration data 133 includes one or more node configurations that are sought to be applied to various nodes. The target configuration for a given node may initially be based on the expected configuration for the node, but with one or more changes to the parameters and/or corresponding values of the parameters. In some implementations, the expected configuration data 131 and/or target configuration data 133 use XML (extensible markup language) to define the table structure used to configure the nodes, whereby the table structure conforms to the ANSI (American National Standards Institute) C12.19 standard.

The parameter reference 135 specifies the relationship among the various possible parameters, as well as the possible values that correspond to the parameters. In some implementations, the parameter reference 135 uses XML to define the various possible ANSI C12.19 table structures used to configure the nodes, as well as indicating the parameters and parameter values that may determine the various different table structures. From the definitions expressed in the parameter reference 135, the parameters that are dependent upon a particular configuration change (e.g. a change in a parameter value) can be determined.

The instruction data 137 includes one or more sets of instructions, where each set of instructions directs a node to make one or more configuration changes after any specified governing parameter values have been validated. The instruction data 137 may further include metadata related to the sets of instructions, where the metadata identifies one or more nodes 107 to which the instructions should be applied, conditions under which the instructions should or should not be applied, actions to be initiated upon success or failure in the application of the instructions, and/or other possible metadata as can be appreciated. In order to validate the parameters, the instructions direct the node 107 to calculate a checksum for the corresponding value of each of the identified governing parameters configured in the node. The instructions further direct the node to make the identified configuration change to its configuration once it has been verified that the checksum(s) calculated by the node match the corresponding checksum(s) specified by the instructions.

The headend system 106, such as a Command Center or other type of headend system, is representative of one or more computing devices that may be used to manage the nodes 107 and to process the information received from the nodes. Among the various applications and other functionality executed on the headend system 106, the configuration manager 161 facilitates updating configurations 171 of various nodes 107 via the network 109b. The configuration updates are directed based upon one or more sets of instruction data 137 received from the computing device 103 for application to one or more of the nodes 107.

Each of the nodes 107 represents any network-enabled device which is capable of receiving instructions via the network 109b, performing the instructions received to validate its current configuration, and implement instructed changes to its configuration in response to the result of the validation. In some implementations, a node 107 can be a meter located at a facility, such as a house or apartment, that measures the consumption of a utility such as gas, water, or electric power. Such a meter can be part of an advanced metering infrastructure (AMI), radio frequency (RF) network. Other examples of nodes include a router, collector or collection point, host computer, hub, or other electronic device that is attached to a network and is capable of sending, receiving, or forwarding information over a communications channel.

A node 107 can contain several components that enable it to function within implementations of the present invention. For example, a node 107 can include a radio that can enable it to communicate with like nodes 107 and/or other devices in a mesh network or other network topologies, such as in the network 109b. The radio of each node 107 may have a programmable logic controller (PLC)-like device that can enable the radio to function like a computer, carrying out computer and command functions to provide implementations of the present invention described herein. A node 107 may also include a storage medium for storing information related to communication with other nodes. Such storage mediums can include a memory, a flash drive, CD-ROM, DVD, or other storage devices located internal to the node or accessible by the node via a network, for example. A node 107 may also include a crystal oscillator (i.e. a clock) to provide time-keeping and a battery to provide back-up power. Some nodes 107 may be powered only by a battery.

Figure 2:
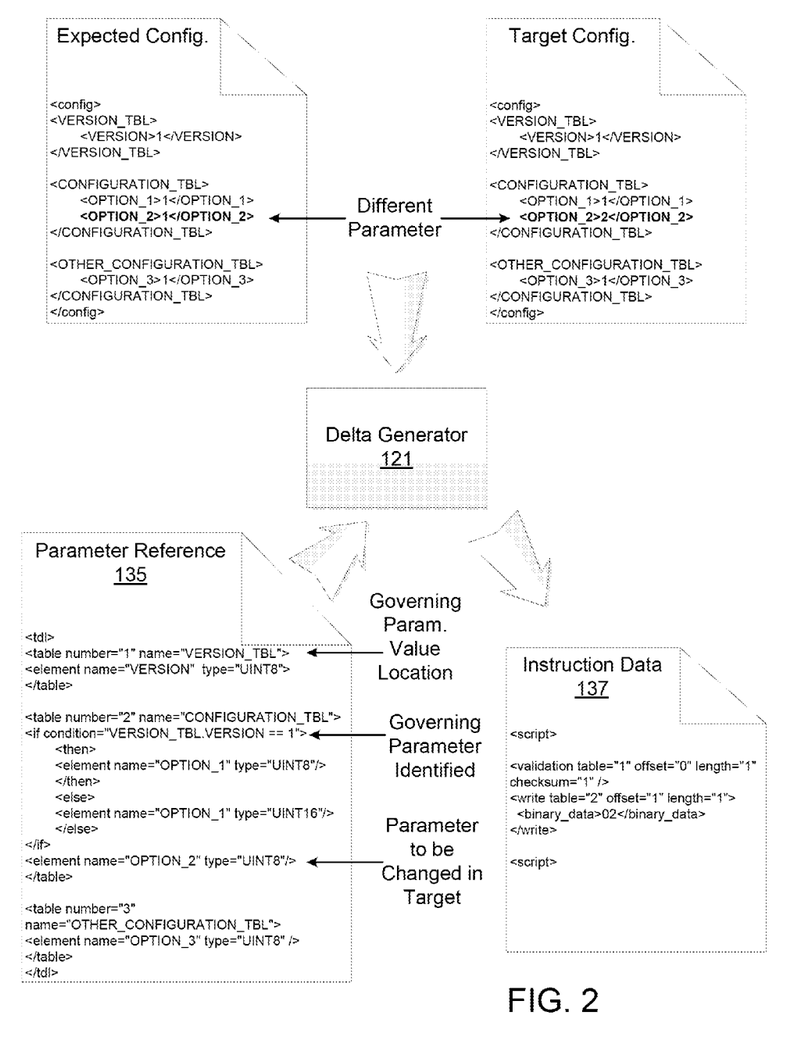
FIG. 2 is an illustrative diagram of the operation of the delta generator in the networked environment of FIG. 1 according to various embodiments of the present disclosure.

Next, a general description of the operation of the various components of the networked environment 100 is provided. To begin, in order to create instructions for updating the configuration of a particular node 107, the delta generator 121 obtains target configuration data 133 for the node and expected configuration data 131 for the node. Shown in FIG. 2 is an exemplary illustration of the various data sources from which instruction data 137 for a particular node 107 can be generated by the delta generator 121. Although the various data represented in FIG. 2 is formatted using XML, other binary or text data formats are possible. A portion of the expected configuration data 131 for the node is represented by the expected config, and a portion of the target configuration data 133 for the node 107 is represented by the target config. The delta generator 121 then compares the expected config for the node with the target config for the node.

Based upon the comparison, the delta generator determines whether any differences exist between the expected config and the target config. Here, the only difference in the two configs is the value for the "OPTION_2" parameter of a table named "CONFIGURATION_TBL." In the expected config, the value for this parameter is '1', whereas in the target config the value for the parameter is '2'. Hence, the value of this parameter will eventually need to be set to '2' in the config 171 of the node 107. In order to determine if any parameter depends upon the parameter whose value is to be changed (i.e. the "different parameter"), the delta generator consults the parameter reference 135.

In the excerpt of the parameter reference 135 shown in FIG. 2, the different parameter (i.e. OPTION_2 in the CONFIGURATION_TBL) is defined to have a value that is an unsigned 8-bit integer, shown as "UINT8." However, the location in which the value for the different parameter is to be placed within the CONFIGURATION_TBL that is configured in a node 107 depends upon the space allocated to other parameter values defined earlier in the same table. The exemplary parameter reference 135 shown in FIG. 2 defines the table element "OPTION_1" before OPTION_2 within the CONFIGURATION_TBL, thus the location for OPTION_2 is subsequent and adjacent to space allocated to OPTION_1. However, based on the conditional statement (i.e. IF THEN-ELSE) used to define OPTION_1 in the parameter reference 135, the space allocated to OPTION_1 depends upon the value of the "VERSION" parameter in the table named "VERSION_TBL." Thus, the VERSION parameter may be referred to as a "governing parameter."

In particular, according to the parameter reference 135, if the value of the VERSION parameter is '1,' then OPTION_1 is allocated space for an unsigned 8-bit integer value, identified as UINT8. Hence, if the parameter value of VERSION is '1', then OPTION_2 would be placed in the CONFIGURATION_TBL after the first 8-bits (1 byte) allocated to OPTION_1. Alternatively, if the value of the VERSION parameter is something other than '1,' then OPTION_1 is allocated space for an unsigned 16-bit integer, identified as "UINT16." Hence, if the parameter value of VERSION is not '1', then OPTION_2 would be placed in the CONFIGURATION_TBL after the first 16-bits (2 bytes) allocated to OPTION_1.

Thus, based on the examination of the parameter reference, the delta generator 121 determines that in order to change the parameter value of OPTION_2 of the CONFIGURATON_TBL, the only governing parameter is VERSION of the VERSION_TBL. As discussed above, identifying a parameter in the parameter reference 135 that is the subject of a conditional statement defined within the same table as a parameter to be changed is one possible way in which the delta generator 121 can identify governing parameters.

As such, the delta generator 121 identifies the value for the VERSION parameter from the expected config and calculates a checksum of the value. The checksum may be calculated using various possible algorithms, such as a value summation, CRC-16/32 (cyclical redundancy check), MD-4/5, SHA-1/2/3 (secure hash algorithm), and/or other possibilities as can be appreciated. In some implementations, particularly where the parameter values are small, the parameter value itself may be used as checksum value. If additional governing parameters had been identified, the delta generator 121 would continue calculating the checksums for any remaining governing parameter values.

Thereafter, the delta generator 121 can prepare the set of instructions to apply the configuration change to the config 171 of the particular node 107. The instructions specify how to validate the values of any governing parameters, such as how to determine the values and what the values should be, then if the validation is successful (i.e. the corresponding checksums match), the values to which the one or more different parameters should be assigned. As described above in the example of FIG. 2, the governing parameter value for VERSION in the VERSION_TBL should be validated before committing a change to the value of the OPTION_2 parameter. The parameter reference 135 specifies that the VERSION parameter value is an unsigned 8-bit integer value (i.e. UINT8) located as the first element in the VERSION_TBL, where the table is also identified by the table identifier '1'.

The delta generator 121 produces the set of instructions that first validates the governing parameter value by having the node 107 validate a value at a location of the node that the parameter reference 135 specified should correspond to the VERSION parameter. In particular, the instruction data 137 specifies validating that a value located in table '1' of the node (i.e. the VERSION_TBL), at offset '0', length '1' corresponds to a checksum of '1'. In this example, the "offset" in the instructions corresponds to the number of bytes from the start of a given table, which here is the VERSION_TBL (also identified as table '1'), such that the offset of '0' is the start of the table. The "length" in the instructions corresponds to the number of bytes allocated to a value for a parameter, which here is one byte (corresponding to the 1-byte UINT8 type). Thus, the instructions specify to validate that the checksum of the value found in the node at the first byte (offset 0, length 1) of table 1 is equal to '1'.

If the governing parameter value found in the node is validated (i.e. the checksums match), the "write" portion of the instructions specify writing a value of '02' at a location of the node that corresponds to OPTION_2 in the CONFIGURATION_TBL, as specified by the parameter reference 135. Here, the instructions specify that the write should occur at table '2' (the identifier for the CONFIGURATION_TBL), offset '1', length '1'. Since an offset of zero represents the first byte of a table, the offset of '1' specifies that the write should occur starting at the second byte of the table; a length of '1' indicates that one byte is allocated to the parameter value. Once the instructions are generated, including any metadata to identify the node(s) to which the instructions should be applied, the instructions may be transmitted to the headend system 106 via the network 109a (FIG. 1).

Figure 3:
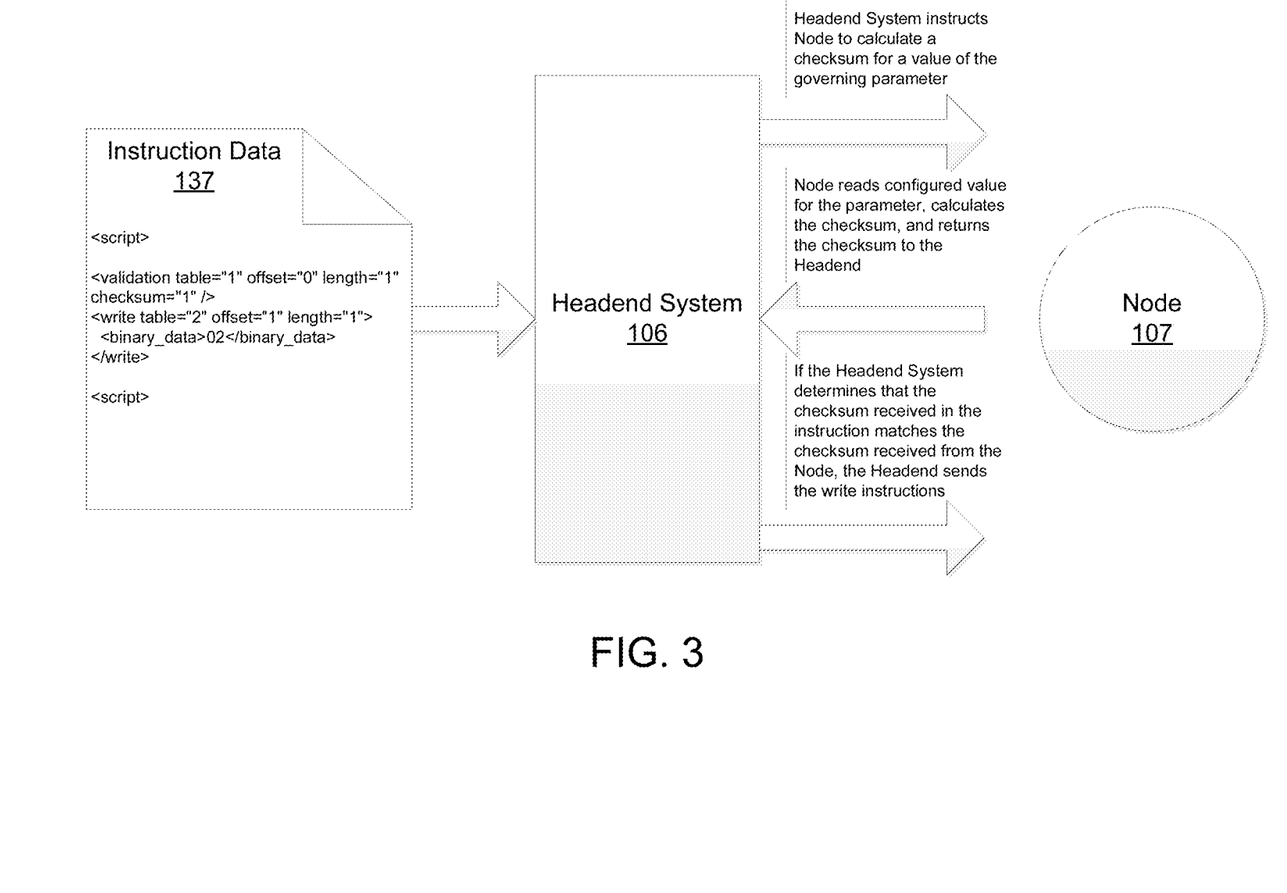
FIG. 3 is an illustrative diagram of the operation of the configuration manager in the networked environment of FIG. 1 according to various embodiments of the present disclosure.

Next, as shown in FIG. 3, the headend system 106 receives the instruction data 137. Once the headend system 106 identifies a node 107 to receive the instructions, the headend system 106 transmits, via the network 109b (FIG. 1), an instruction to the node to determine a checksum for the value found at the specified location in the node and return the checksum result to the headend system 106. As described previously, the specified location corresponds to the location of a value for a governing parameter configured in the node. In the illustrative example of FIG. 3, the instruction data 137 specifies that the node 107 should determine the checksum for a value located in table '1' of the node (i.e. the VERSION_TBL), at offset '0', length '1'.

If the headend system 106 determines that the checksum received from the node matches the checksum specified in the instructions (i.e. calculated from the governing parameter value in the expected config), then the headend system 106 instructs the node to write a specified value at a specified location in the node based on the instructions. As described previously, the specified value given in the instructions corresponds to the value of a different parameter found in the target config, and the specified location corresponds to the location allocated to the value for the different parameter in the node 107. In the illustrative example of FIG. 3, the "write" portion of the instruction data 137 specifies writing a value of '02' at table '2' (the identifier for the CONFIGURATION_TBL), offset '1', length '1'. As specified by the parameter reference, this location corresponds to OPTION_2 in the CONFIGURATION_TBL of the node.

In some implementations, the headend system 106 may transmit each write operation and any associated validation operations to the node 107 to be performed, wherein the node 107 itself determines if the governing parameter values are successfully validated prior to performing the configuration change. In these embodiments, the node 107 may report the success or failure of the configuration change back to the headend system 106.

Figure 4:
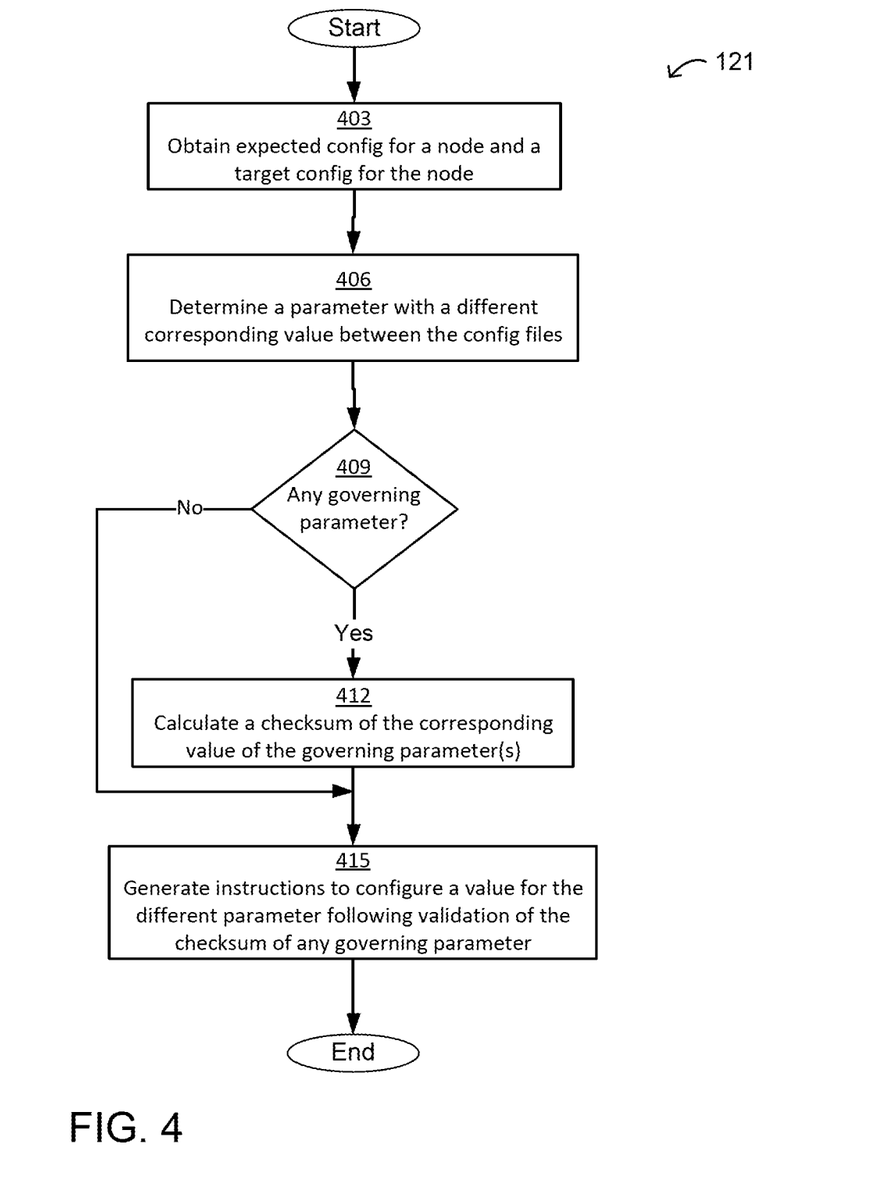
FIG. 4 is a flowchart illustrating one example of functionality implemented as portions of the delta generator executed in a computing device in the networked environment of FIG. 1 according to various embodiments of the present disclosure.

Referring next to FIG. 4, shown is a flowchart that provides one example of the operation of a portion of the delta generator 121 according to various embodiments. It is understood that the flowchart of FIG. 4 provides merely an example of the many different types of functional arrangements that may be employed to implement the operation of the portion of the delta generator 121 as described herein. As an alternative, the flowchart of FIG. 4 may be viewed as depicting an example of elements of a method implemented in the computing device 103 (FIG. 1) according to one or more embodiments.

Beginning with block 403, the delta generator 121 obtains a target configuration for the node and an expected configuration for the node. The configs may be formatted using XML, but other binary or textual data formats are possible. Next, in block 406, the delta generator 121 determines any parameters with different corresponding values between the expected config and the target config, where any such parameters can be referred to as different parameters. For example, the value of the OPTION_2 parameter in the expected config is '1', while the value of the OPTION_2 parameter in the target config is '2'. In some implementations, the delta generator 121 may further determine if any parameters are added to or removed from the target config as compared to the expected config. For example, the target config may include the addition of a parameter identified as OPTION_3 in a particular table that is not included in the expected config. The possible parameters for nodes and the space allocated for them in the nodes is specified in the parameter reference 135 to which the delta generator 121 can refer.

Then, in block 409, the delta generator 121 determines whether the different parameter in the node depends on any other parameters as may be specified or inferred from an examination of the parameter reference. The nature of the dependency can be expressed in different ways, such as the specific location of the different parameter in the node depending upon the value of the governing parameter. If the delta generator does not identify any governing parameters, execution of the delta generator 121 proceeds to block 415. Alternatively, if one or more governing parameters are identified, in block 412, the delta generator 121 calculates a checksum of a value corresponding to each of the governing parameters. The checksum may be computed using various possible algorithms, such as a value summation, CRC-16/32, MD-4/5, SHA-1/2/3, and/or other possibilities as can be appreciated. In some implementations, particularly where the parameter values are small, the checksum may be "calculated" to be the parameter value itself.

Next, in block 415, the delta generator 121 can prepare the set of instructions to apply the configuration change to the one or more different parameters in the node 107. The instructions specify how to first validate the values of any governing parameters, then the values to which the one or more different parameters should be assigned if the validation is successful or if no governing parameters exist. Once the instructions have been generated, the delta generator 121 may store the set of instructions in the instruction data 137 and/or transmit the instructions to the headend system 106. Since the instructions can be based on not only a target configuration for a node, but also the expected configuration for the node, different nodes may use different sets of instructions even if the target configurations for the nodes are the same. Thereafter, this portion of the execution of the delta generator 121 ends as shown.

Figure 5:
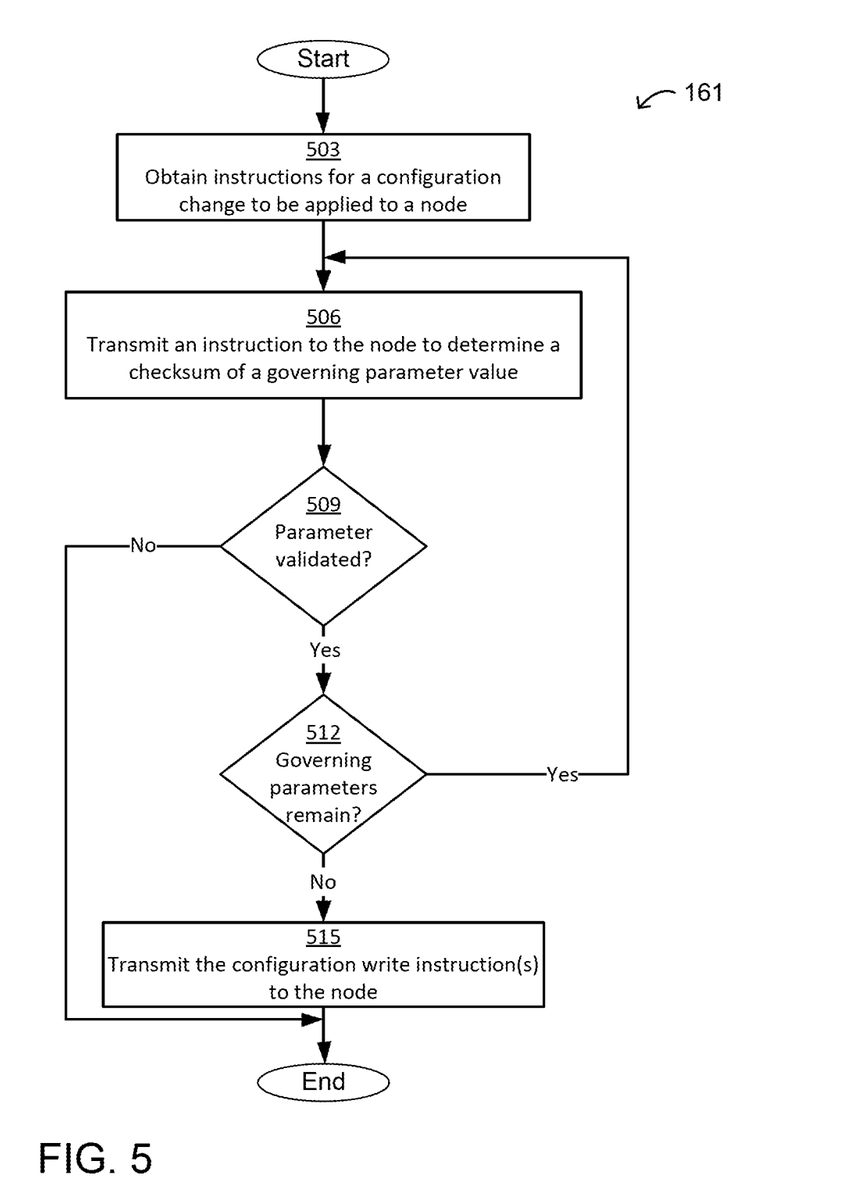
FIG. 5 is a flowchart illustrating one example of functionality implemented as portions of the configuration manager executed in a headend system in the networked environment of FIG. 1 according to various embodiments of the present disclosure.

Referring next to FIG. 5, shown is a flowchart that provides one example of the operation of a portion of the configuration manager 161 according to various embodiments. It is understood that the flowchart of FIG. 5 provides merely an example of the many different types of functional arrangements that may be employed to implement the operation of the portion of the configuration manager 161 as described herein. As an alternative, the flowchart of FIG. 5 may be viewed as depicting an example of elements of a method implemented in the headend system 106 (FIG. 1) according to one or more embodiments.

In block 503, the headend system 106 obtains at least a portion of the instruction data 137 that includes a set of instructions for a configuration change to be applied to a node. Next, in block 506, the configuration manager 106 transmits, via the network 109*b* (FIG. 1), an instruction to the node to determine a checksum for the value found at the specified location in the node and return the checksum result to the headend system 106. As described previously, the specified location corresponds to the location of a value for a governing parameter configured in the node.

Then, in block 509, the configuration manager 161 validates the received checksum by determining whether the checksum for the governing parameter value received from the node 107 matches the checksum for the governing parameter value specified in the instructions. If the checksums for the governing parameter values do not match, the validation fails and execution of this portion of the configuration manager 161 may end as shown with no configuration change being made to the node. In some implementations, the configuration manager 161 generates a notification message indicating the failure or success of attempts to change the configuration of a node, as well as possibly including a reason in the event that the configuration change fails. The notification message may be sent to the delta generator 121 in order to maintain status of the expected config data 131. For example, one reason for failure is that the expected configuration was not found on the node (i.e. the governing parameter value was not as expected). Alternatively, if validation of the governing parameter is successful, in block 512, the configuration manager 161 determines whether any other governing parameter specified by the instructions remains to be validated. If a governing parameter remains to be validated, execution of the configuration manager 161 returns to block 506 to validate the next governing parameter.

Otherwise, if all governing parameters specified in the instructions have been validated, in block 515, the configuration manager 161 instructs the node 107 to, based on the instructions, write a specified value at a specified location in the node for each of the parameters to be changed. The specified value given in the instructions corresponds to the value of a different parameter found in the target config, and the specified location corresponds to the location allocated to the value for the different parameter in the node 107. Thereafter, this portion of the execution of the configuration manager 161 ends as shown.

Figure 6A:
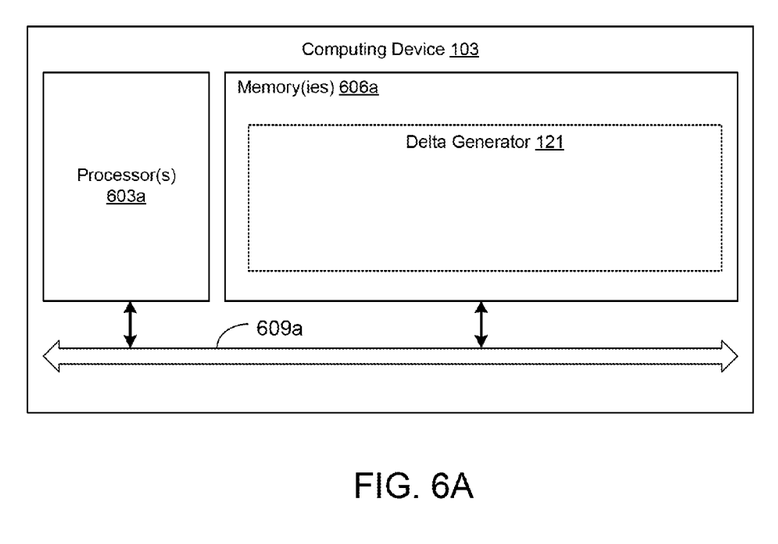
FIG. 6A is a schematic block diagram that provides one example illustration of a computing device employed in the networked environment of FIG. 1 according to various embodiments of the present disclosure.
Figure 6B:
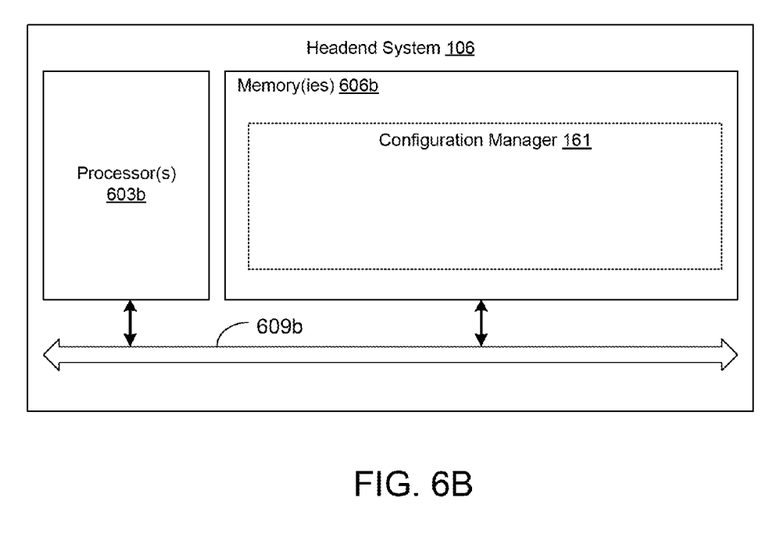
FIG. 6B is a schematic block diagram that provides one example illustration of a headend system employed in the networked environment of FIG. 1 according to various embodiments of the present disclosure.

With reference to FIGS. 6A and 6B, shown are schematic block diagrams of computing devices representing the computing device 103 and headend system 106, respectively, according to an embodiment of the present disclosure. Each computing device includes at least one processor circuit, for example, having a processor 603*a*/603*b* and a memory 606*a*/606*b*, both of which are coupled to a local interface 609*a*/609*b*. To this end, each computing device may comprise, for example, at least one server computer or like device. The local interface 609*a*/609*b* may comprise, for example, a data bus with an accompanying address/control bus or other bus structure as can be appreciated.

Stored in the memory 606*a*/606*b* are both data and several components that are executable by the processor 603*a*/603*b*. In particular, stored in the memory 606*a*/606*b* and executable by the processor 603*a*/603*b* are a delta generator 121 or a configuration manager 161, and potentially other applications. Also stored in the memory 606*a*/606*b* may be a data store and other data. In addition, an operating system may be stored in the memory 606*a*/606*b* and executable by the processor 603*a*/603*b*.

It is understood that there may be other applications that are stored in the memory 606*a*/606*b* and are executable by the processor 603*a*/603*b* as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606*a*/606*b* and are executable by the processor 603*a*/603*b*. In this respect, the term "executable" means a program file that is in a form that can ultimately be run by the processor 603*a*/603*b*. Examples of executable programs may be, for example, a compiled program that can be translated into machine code in a format that can be loaded into a random access portion of the memory 606*a*/606*b* and run by the processor 603*a*/603*b*, source code that may be expressed in proper format such as object code that is capable of being loaded into a random access portion of the memory 606*a*/606*b* and executed by the processor 603*a*/603*b*, or source code that may be interpreted by another executable program to generate instructions in a random access portion of the memory 606*a*/606*b* to be executed by the processor 603*a*/603*b*, etc. An executable program may be stored in any portion or component of the memory 606*a*/606*b* including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 606*a*/606*b* is defined herein as including both volatile and nonvolatile memory and data storage components. Volatile components are those that do not retain data values upon loss of power. Nonvolatile components are those that retain data upon a loss of power. Thus, the memory 606*a*/606*b* may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603*a*/603*b* may represent multiple processors 603*a*/603*b* and/or multiple processor cores and the memory 606*a*/606*b* may represent multiple memories 606*a*/606*b* that operate in parallel processing circuits, respectively. In such a case, the local interface 609*a*/609*b* may be an appropriate network that facilitates communication between any two of the multiple processors 603*a*/603*b*, between any processor 603*a*/603*b* and any of the memories 606*a*/606*b*, or between any two of the memories 606*a*/606*b*, etc. The local interface 609*a*/609*b* may comprise additional systems designed to coordinate this communication, including, for example, performing load balancing. The processor 603a/603b may be of electrical or of some other available construction.

Although the delta generator 121, configuration manager 161, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the delta generator 121 and configuration manager 161, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603a/603b in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the delta generator 121 and configuration manager 161, that comprises software or code can be embodied in any non-transitory computer-readable medium for use by or in connection with an instruction execution system such as, for example, a processor 603a/603b in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the delta generator 121 and configuration manager 161, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or in multiple computing devices. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for configuring a node in a network, the method comprising:
    obtaining, in a computing device, an expected configuration file for the node and a target configuration file for the node, the configuration files each specifying a plurality of parameters with corresponding values, wherein the parameters include a version identifier;
    determining, in the computing device, a different one of the parameters having different corresponding values between the configuration files based upon a comparison of the configuration files;
    determining, in the computing device, a governing one of the parameters on which a location of the different parameter in the node is dependent based at least in part upon a parameter reference;
    determining, in the computing device, the location of the different parameter in the node based at least in part upon the parameter reference and a corresponding value of the governing parameter specified by the expected configuration file, wherein the governing parameter is determined to be the version identifier;

calculating, in the computing device, a checksum for the governing parameter based at least in part upon the corresponding value of the governing parameter specified by the expected configuration file;
generating, in the computing device, instructions for a headend system to:
  determine a checksum for the governing parameter currently configured in the node based at least in part upon a corresponding value of the governing parameter currently configured in the node; and
  in response to the checksums matching, configure the different parameter at the location in the node with a corresponding value of the different parameter as specified by the target configuration file; and
transmitting, in the computing device, the instructions to the headend system.

2. The method of claim 1, further comprising:
receiving, in the headend system, the instructions for configuring the node;
transmitting, in the headend system, a first one of the instructions to the node to calculate the checksum for the governing parameter currently configured in the node;
receiving, in the headend system, the checksum for the governing parameter currently configured in the node; and
in response to the checksum for the governing parameter from the node matching the checksum specified by the received instructions, transmitting, in the headend system, a second one of the instructions to the node to configure the corresponding value of the different parameter in the node.

3. The method of claim 2, further comprising, in response to the checksum for the governing parameter from the node differing from the checksum specified by the instructions, generating, in the headend system, a notification message indicating that the expected configuration was not present on the node.

4. The method of claim 1, wherein the checksum is a cyclical redundancy check (CRC).

5. The method of claim 1, wherein the corresponding value of the governing parameter specified by the expected configuration file is the same as a corresponding value of the governing parameter specified by the target configuration file.

6. The method of claim 1, wherein structure of the parameter reference is defined by ANSI (American National Standards Institute) C12.19.

7. The method of claim 6, wherein the location of the different parameter in the node refers to the location in a table stored in the node, wherein the table is conforms to ANSI C12.19.

8. A non-transitory computer-readable medium embodying a program executable in a computing device, comprising:
code that obtains an expected configuration file for a node and a target configuration file for the node, the configuration files each specifying a plurality of parameters with corresponding values;
code that determines a different one of the parameters having different corresponding values between the configuration files based upon a comparison of the configuration files;
code that determines a governing one of the parameters on which the different parameter is dependent based at least in part upon a parameter reference;
code that calculates a checksum for the governing parameter based at least in part upon a corresponding value of the governing parameter specified by the expected configuration file;
code that generates instructions for a headend system to:
  determine a checksum for the governing parameter currently configured in the node based at least in part upon a corresponding value of the governing parameter currently configured in the node; and
  in response to the checksums matching, configure the different parameter in the node with a corresponding value of the different parameter as specified by the target configuration file; and
code that transmits the instructions for configuring the node to the headend system.

9. The non-transitory computer-readable medium of claim 8, wherein the node is a smart meter in an AMI (advanced metering infrastructure) network.

10. The non-transitory computer-readable medium of claim 8, wherein the program further comprises code that determines a location of the different parameter in the node is dependent based at least in part upon the parameter reference and the corresponding value of the governing parameter specified by the expected configuration file.

11. The non-transitory computer-readable medium of claim 10, wherein the location of the different parameter in the node refers to the location in a table stored in the node, wherein the table is conforms to ANSI C12.19.

12. The non-transitory computer-readable medium of claim 8, wherein the governing parameter is a version identifier.

13. The non-transitory computer-readable medium of claim 8, wherein the headend system manages the configuration of the node.

14. A system, comprising:
a computing device comprising a processor and a memory; and
a delta generator executed in the computing device, the delta generator comprising logic that:
  obtains an expected configuration file for a node and a target configuration file for the node, the configuration files each specifying a plurality of parameters with corresponding values;
  determines a different one of the parameters having different corresponding values between the configuration files based upon a comparison of the configuration files;
  determines a governing one of the parameters on which the different parameter is dependent based at least in part upon a parameter reference;
  calculates a checksum for the governing parameter based at least in part upon a corresponding value of the governing parameter specified by the expected configuration file;
  generates instructions for a second computing device to:
    determine a checksum for the governing parameter currently configured in the node based at least in part upon a corresponding value of the governing parameter currently configured in the node; and
    in response to the checksums matching, configure the different parameter in the node with a corresponding value of the different parameter as specified by the target configuration file; and
  transmits the instructions to a second computing device.

15. The system of claim 14, further comprising:
the second computing device executing a configuration manager comprising logic that:
- receives the instructions for configuring the node;
- transmits a first one of the instructions to the node to calculate the checksum for the governing parameter currently configured in the node;
- receives the checksum for the governing parameter currently configured in the node; and
- in response to the checksum for the governing parameter from the node matching the checksum specified by the received instructions, transmits a second one of the instructions to the node to configure the corresponding value of the different parameter in the node.

16. The system of claim 15, wherein the configuration manager further comprises logic that, in response to the checksum for the governing parameter from the node differing from the checksum specified by the instructions, generates a notification message indicating that the expected configuration was not present on the node.

17. The system of claim 14, wherein the delta generator further comprises logic that determines a location of the different parameter in the node is dependent based at least in part upon the parameter reference and the corresponding value of the governing parameter specified by the expected configuration file.

18. The system of claim 17, wherein the location of the different parameter in the node refers to the location in a table stored in the node, wherein the table is conforms to ANSI C12.19.

19. The system of claim 14, wherein the corresponding value of the governing parameter specified by the expected configuration file is the same as a corresponding value of the governing parameter specified by the target configuration file.

20. The system of claim 14, wherein the node is a smart meter in an AMI (advanced metering infrastructure) network.

* * * * *